United States Patent [19]
Huotari

[11] Patent Number: 5,632,632
[45] Date of Patent: May 27, 1997

[54] FLOWMETER ALIGNMENT DEVICE

[75] Inventor: Wendell G. Huotari, Cokato, Minn.

[73] Assignee: Rosemount Inc., Eden Prairie, Minn.

[21] Appl. No.: 314,873

[22] Filed: Sep. 29, 1994

[51] Int. Cl.$^6$ ................................................ H01R 4/66
[52] U.S. Cl. ........................ 439/100; 285/24; 439/927
[58] Field of Search .............................. 285/24, 27, 379, 285/5; 174/78; 439/100, 927

[56] References Cited

U.S. PATENT DOCUMENTS

| | | | |
|---|---|---|---|
| 865,498 | 9/1907 | Kenyon | 285/27 |
| 3,603,617 | 9/1971 | Lochridge | 285/24 |
| 4,345,464 | 8/1982 | Herzl et al. | 73/201 |
| 4,492,815 | 1/1985 | Maros | 174/78 |
| 4,986,574 | 1/1991 | Beckman | 285/24 |
| 5,433,490 | 7/1995 | Hurd et al. | 285/27 |
| 5,462,313 | 10/1995 | Rea et al. | 285/379 |

FOREIGN PATENT DOCUMENTS

| | | |
|---|---|---|
| 0437193A1 | 7/1991 | European Pat. Off. |
| 0446538A1 | 9/1991 | European Pat. Off. |
| 1217490 | 5/1960 | France . |
| 2192725 | 1/1988 | United Kingdom . |

OTHER PUBLICATIONS

*Rosemount Product Manual* 4003A00, "Model 8800 Smart Vortex Flowmeter", Rosemount Inc., Chanhassen, MN, Aug. 1994, pp. 2–8.

*Marks' Standard Handbook for Mechanical Engineers*, Ninth Edition –McGraw–Hill Book Company, 1987, pp. 8–205, 8–208 –8–210.

*Rosemount MAN* 4643, "Model 8703 High–Signal Magnetic Flowmeter Flowtube", Rosemount Inc., Chanhassen, MN, Mar. 1992, pp. 2–9, 4–1.

*The Rosemount SMART FAMILY Manual* 4565, "Model 8701 Magnetic Flowmeter Flowtube", Rosemount Inc., Chanhassen, MN, Mar. 1990, p. 6–4.

*Rosemount MAN* 4564, "Model 8711 Magnetic Flowmeter Flowtube", Rosemount Inc., Chanhassen, MN, Aug. 1991, pp. 2–2, 2–4, 2–6.

*Primary Examiner*—Richard Chilcot
*Assistant Examiner*—Jewel V. Artis
*Attorney, Agent, or Firm*—Westman, Champlin & Kelly, P.A.

[57] ABSTRACT

A flowmeter alignment device comprises an alignment ring affixed to an end of a flowmeter flowtube and having spring fingers to engage the circumference of a pipe flange raised face. In another embodiment a flowmeter alignment device comprises a semicircular or other arcuate body affixed to the flowtube end, the arcuate body adapted to mate with the circumference of a pipe flange raised face. The arcuate body is shaped to permit lateral installation and removal of the flowtube from a mating pipe flange. In still another embodiment an alignment ring is adapted also for use as an electrical grounding ring for electromagnetic flowmeters, or as an orifice plate for differential pressure-based flowmeters.

17 Claims, 3 Drawing Sheets

FLOWMETER ALIGNMENT DEVICE

BACKGROUND OF THE INVENTION

When installing a flowmeter in a fluid handling system, it is important to align the fluid-handling passageway of the flowmeter with the passageway of adjoining conduits to ensure smooth fluid flow and avoid fluid disturbances caused by protruding misaligned parts. As flowmeter accuracy improves, the need to ensure accurate alignment becomes increasingly important. The present invention relates to arrangements for aligning a flowmeter with a pipe end, and in particular with a raised face pipe flange.

In U.S. Pat. No. 4,986,574, herein incorporated by reference, and assigned to Fisher Controls International, Inc., an affiliate of the assignee of the present invention, Beckman teaches the use of an alignment tool comprising a plate-like ring with outwardly diverging spring fingers. The spring fingers diverge outwardly from both sides of the plate-like ring and engage the raised face portions of two mating flanges to maintain them in self centering alignment.

An object of one aspect of the present invention is to provide an alignment mechanism similar to that of U.S. Pat. No. 4,986,574 but with a reduced number of separate components to improve alignment, simplify installation, and reduce inventory.

An object of another aspect of the invention is to provide an alignment mechanism for a flowmeter which permits lateral installation and removal of the flowmeter.

Other objects of the invention will become apparent from the detailed description of the invention and the accompanying drawings.

BRIEF SUMMARY OF THE INVENTION

In a first aspect of the present invention, a flowmeter is adapted for coupling to a raised face pipe flange. The flowmeter includes a flowtube having an end surface and an alignment ring affixed to the end surface, the alignment ring sized to engage at least a portion of the raised face of the pipe flange. In a second aspect of the invention the alignment ring is truncated to an arc, or alternately to a plurality of raised areas, in such a way as to permit lateral installation or removal of the flowtube from the pipe flange. In still other of the an alignment ring is adapted for use as an electrical grounding ring or as an orifice plate. In a preferred embodiment the alignment ring comprises a unitary flat plate having a first and second set of tabs defined therein and bent outward from the plate in opposite directions.

For convenience, items in the figures having the same reference symbol are the same or serve the same or a similar function.

DETAILED DESCRIPTION OF THE PREFERRED EMBODIMENTS

Figure 1:
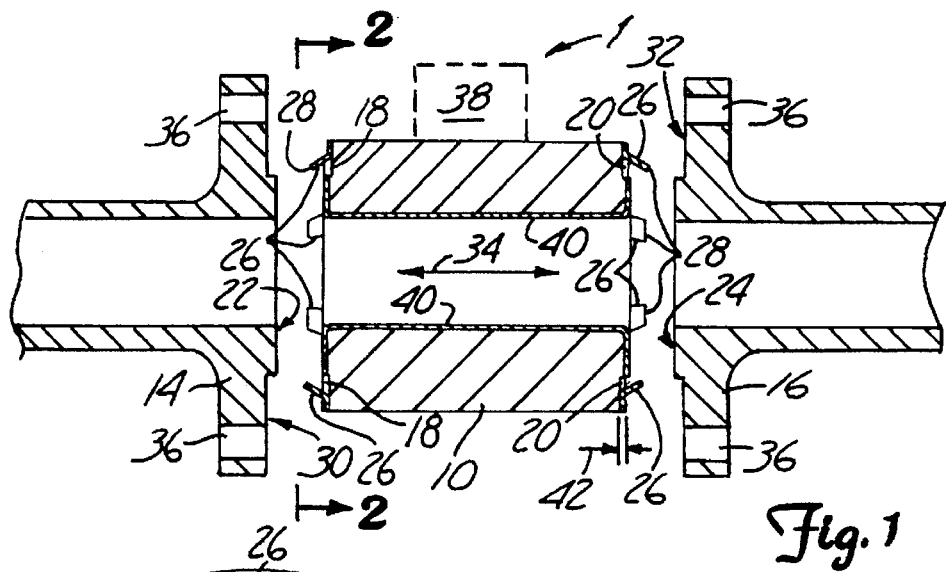
FIG. 1 is an exploded sectional representation of a flowmeter incorporating the alignment device of the present invention, positioned between two pipe flanges.

In FIG. 1, flowtube 10 of flowmeter 12 is to be installed between pipe flanges 14, 16 to measure fluid flow therethrough. According to the invention, flowmeter 12 includes alignment rings 18, 20 affixed at both ends thereof, which alignment rings engage at least a portion of the raised faces 22, 24 of pipe flanges 14, 16, respectively, as the flowmeter and pipe flange are brought together. Preferably, alignment rings 18, 20 comprise unitary metallic sheets with tabs 26 punched or stamped therefrom which act as spring fingers. Tabs 26 are sized and shaped such that as the flowmeter is brought into contact with the pipe flange, the free edges 28 of tabs 26 are compressed inward by flange faces 30, 32 toward a central axis 34 of the flowtube bore, until such edges firmly grip the circumference (outer diameter) of raised faces 22, 24. At the time alignment rings 18, 20 are affixed 10, they are pre-aligned therewith. Thus, for example, as one or more tab free edges 28 begin to engage raised face 22, they push flowtube 10 and pipe flange 30 closer to alignment until, when all the free edges are in gripping engagement with the outer diameter of raised face 22, the mated passageways are in substantial alignment.

As is known, flowtube 10, which is a so-called "wafer" style flowtube, is sandwiched between pipe flanges 14, 16 using bolts or studs (not shown) passing through holes 36, and tightened with nuts at the ends thereof. The alignment rings 18, 20 can also be used with and affixed to so-called "flanged" style flowtubes. In both cases an annular gasket, not shown in FIG. 1, is placed between the pipe flange and the flowtube end (whether flanged or not) to promote sealing between the raised face of the pipe flange and the raised face of the flowtube end. Such gasket can be held in place by tabs 26.

Flowmeter 12 includes an electronics module 38, shown in block form, which receives power from an outside power source and provides an output indicative of flow. Flowmeter 12 can be any one of a variety of flowmeter types, including for example vortex, electromagnetic, and orifice plate/differential pressure. As shown, flowmeter 12 is of the electromagnetic variety as indicated by the thin (electrically insulating) liner 40 covering the wetted surfaces of the flowtube bore. For simplicity, flowtube 10 is shown as a thick solid cylinder, but can of course be of any appropriate construction.

Figure 2:
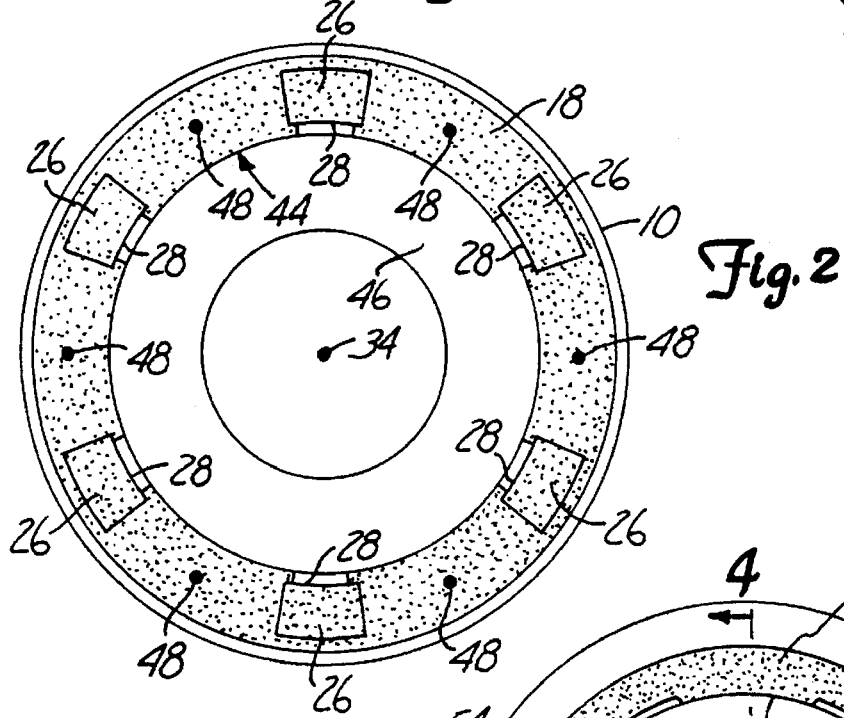
FIG. 2 is an elevational view of the flowmeter of FIG. 1 taken along line 2—2.

FIG. 2 shows a view of flowtube 10 along line 2—2 of FIG. 1. For clarity, alignment ring 18 is shaded. Ring 18 is preferably fabricated from a single piece of a high-strength corrosion-resistant metal, such as 316 stainless steel. The metal thickness should be great enough to make the tabs sufficiently stiff that they do not curl, twist, or otherwise deform during alignment under the weight of the flowtube. However, the metal thickness should not exceed the height 42 of the flowtube raised faces (see FIG. 1). A metal thickness in the range of about 0.015 to 0.060 inches (0.38–1.5 mm) is preferred. An inner diameter 44 of ring 18 is sized to mate with an outer diameter of flowtube raised face 46, to ensure alignment of the ring relative to the flowtube. Alternately, diameter 44 can be larger or smaller and the ring aligned to the flowtube with a separate fixture. Then, ring 18 is preferably permanently affixed to the flowtube end, such as by spot welding at positions 48, or by seam welding, or by other known means. By permanently fixing the alignment rings to the flowtube, the result is a rugged flowmeter having an integral, accurate alignment mechanism. The need for a separate alignment component, which can be bothersome during installation and inconvenient to keep in inventory, is eliminated. Further, the affixed alignment ring can also serve as a temporary holder for the sealing gasket mentioned above.

Semi-permanent methods of attachment of the alignment ring to the flowtube end, such as screws, clips, or the like, can also be used. Such methods permit the removal and replacement of an alignment ring if it becomes damaged, or if the flowmeter is to be coupled to a nonstandard pipe flange. However, semi-permanent attachment methods are generally not preferred in most industrial applications because of the potential for corrosion or damage to the screws or other attachment devices and the potential for misalignment.

Figure 3:
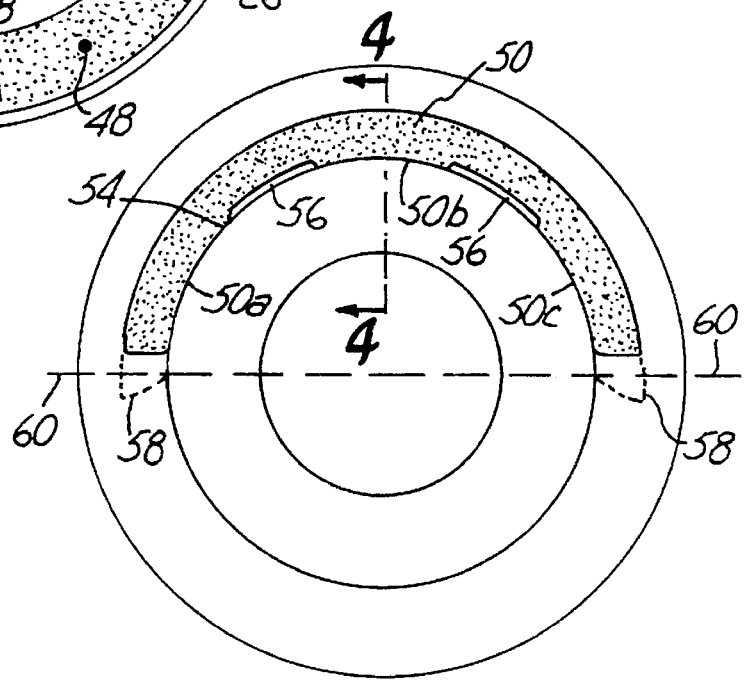
FIG. 3 is an end view of a flowmeter with another embodiment of the invention.
Figure 4:
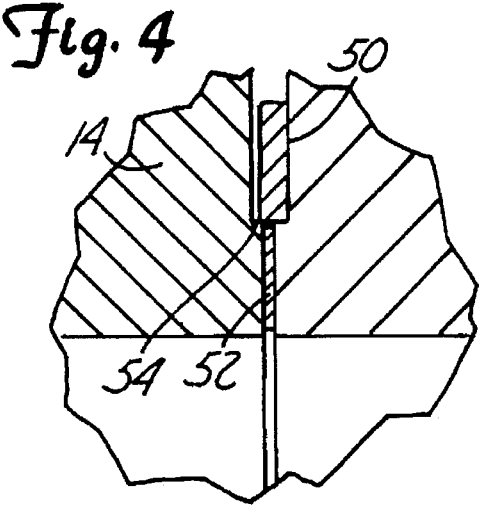
FIG. 4 is a partial sectional view of the flowmeter of FIG. 3, taken along line 4—4, together with a mating pipe flange and a sealing gasket.

In FIG. 3, a view of a flowtube similar to that of FIG. 2 is shown, but with a thick alignment arc 50 substituted for each of the alignment rings 18, 20. FIG. 4 shows a sectional view along line 4—4, together with mating pipe flange 14 and a sealing gasket 52. Alignment arc 50 has a thickness T that satisfies the following inequalty:

$$(T_{fm}+T_g)<T<(T_{fm}+T_g T_{pf}),$$

where $T_{fm}$ is the thickness of the raised face of the flowmeter, $T_g$ is the thickness of the gasket, and $T_{pf}$ is the thickness of the pipe flange raised face. Alignment arc 50 has multiple areas 50a, 50b, 50c which mate with an outer edge 54 of the pipe flange raised face. Such areas are preferably part of a unitary part (as shown) for simplicity and ease of manufacture, but they can also be distinct individual parts separately attached to the flowtube. If desired, undercut areas 56 of arc 50 can be eliminated (i.e., filled in). Also, arc 50 can be extended to broken-line outlines 58 to increase contact between the alignment arc and the pipe flange raised face. Preferably, however, no portion of arc 50 that mates with the pipe flange raised face should extend to the half of the flowmeter end below line 60—60. In this way alignment arc 50 operates as a zero-clearance alignment device because it allows the flowmeter to be lowered into, or removed from, mating contact with the pipe flange with little or substantially no axial separation. Note that for ease of installation, gasket 52 can be held to the flowtube end by an adhesive backing.

Figure 5:
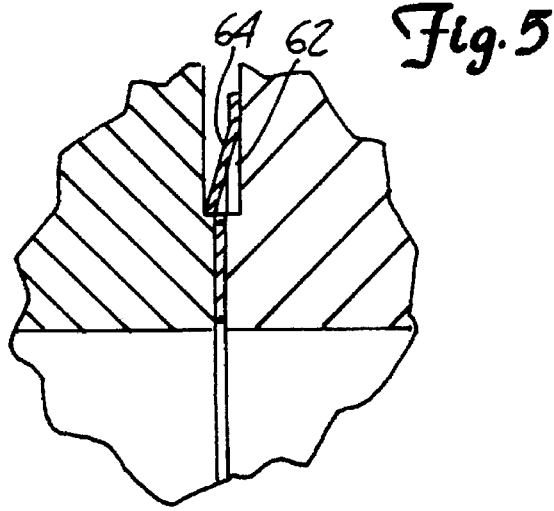
FIG. 5 is a view similar to FIG. 4 but where a spring finger arrangement is substituted for the flat thick alignment component.

An alternate embodiment of an alignment arc is shown in section in FIG. 5. Alignment arc 62 has an arcuate shape similar to that of arc 50 shown in FIG. 4 to permit lateral installation of the flowmeter as described in the preceding paragraph. However, in other respects it resembles alignment tings 18, 20, since it is of relatively thin construction and has spring fingers such as tab 64 along its length to engage the edge of the pipe flange raised surface. An advantage of using spring fingers in the arcuate embodiment is the ability of alignment arc 62 to hold the flowtube in place for a wider range of separation between the flowtube end and pipe flange than the design of FIG. 4, if such separation should exceed the gasket thickness. As with alignment rings 18, 20, alignment arcs 50 and 62 are preferably made of corrosion-resistant metal such as most grades of stainless steel, and they preferably are permanently affixed to the flowtube end, although they can also be semi-permanently affixed thereto.

Figure 6:
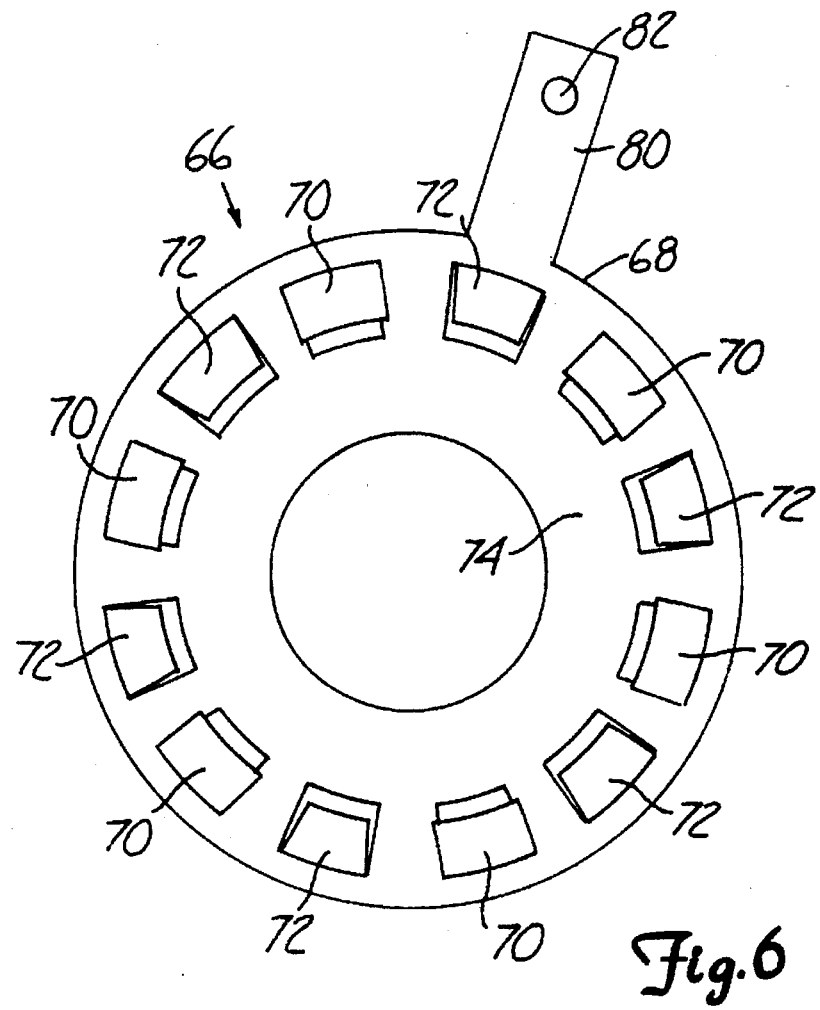
FIG. 6 is a front view of an alignment device useable also as an electrical grounding plate.

A combination alignment ting and electrical grounding ring 66 is shown in FIG. 6. It is known to use electrical grounding rings with electromagnetic flowmeters in order to fix the electric potential of the fluid at the grounding ring position. According to one aspect of the invention, combination ting 66 can be used both as an alignment ring and as a grounding ring. Advantageously, combination ring 66 is made of a unitary flat plate 68 from which both a first set 70 and a second set 72 of alignment tabs are punched. From the perspective of FIG. 6, tabs 70 are then bent away from the plate out of the page, and tabs 72 are bent away from the plate in the opposite direction, into the page. Fabrication of combination ring 66 from a single unitary flat plate simplifies the manufacturing process and lowers the production cost relative to an alignment device such as is taught in U.S. Pat. No. 4,986,574. Use of a single unitary flat plate also yields tabs 70, 72 that have the same thickness as that of the surrounding annular portion 74 of plate 68. Therefore, a lower overall ting thickness is achieved for a given required tab thickness.

Figure 7:
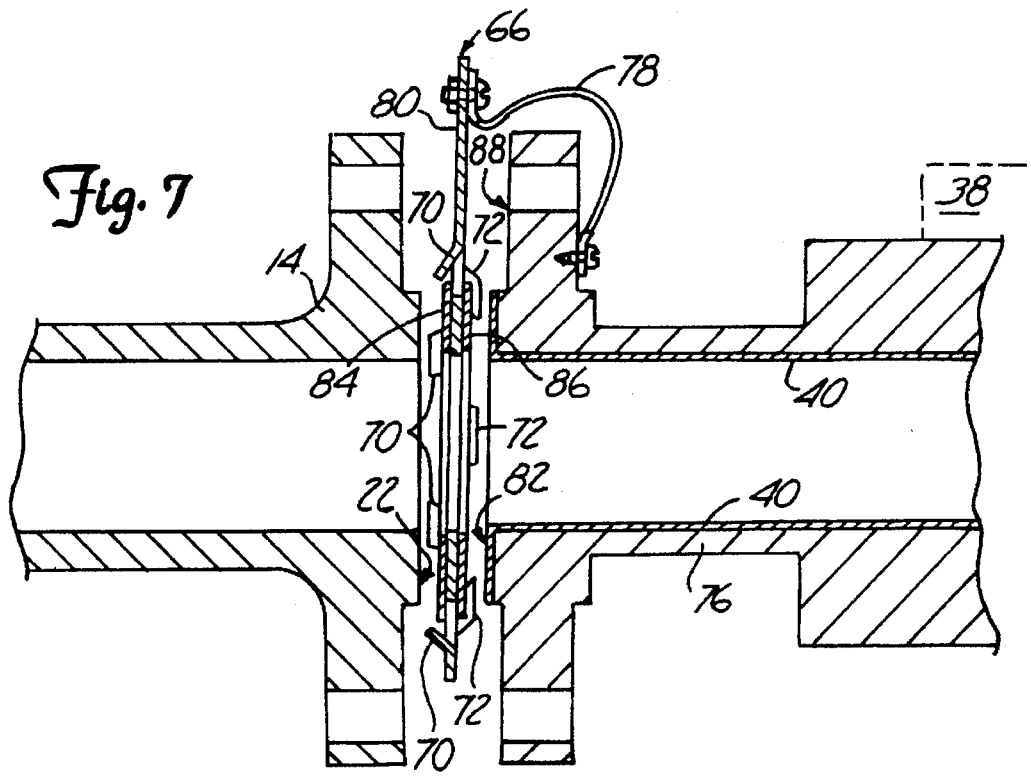
FIG. 7 is an exploded sectional view of a pipe flange/flowmeter connection utilizing the alignment device of FIG. 6.

FIG. 7 shows an exploded sectional view of combination ring 66 between pipe flange 14 and one end of a flanged electromagnetic flowmeter flowtube 76. A short cable 78 provides galvanic contact between the conductive ring 66 and the metal flowmeter housing, and also, if required, to an earth ground. For this purpose ring 66 has a contact tab 80 with a hole 82 therein to facilitate electrical connection thereto. Installation workers can also use contact tab 80 as a handle for manipulating the combination ring during installation.

For alignment, tabs 70 engage the outer diameter of pipe flange raised face 22 and tabs 72 engage the outer diameter of flowmeter raised surface 82 when the flanges are bolted together. Note that tabs 70 can carry a first gasket 84 and tabs 72 can carry a second gasket 86. If desired, flowtube-facing tabs 72 can be bent in the same direction as tabs 70, and combination ring 66 can be aligned with and then attached to the flowtube end with screws or the like. In such case attachment is preferably made to a lower face 88 of the flowtube end, with standoffs between ring 66 and face 88 having a thickness equal to the raised face 82 thickness plus gasket 86 thickness to keep such modified ring 66 flat and unwarped.

Figure 8:
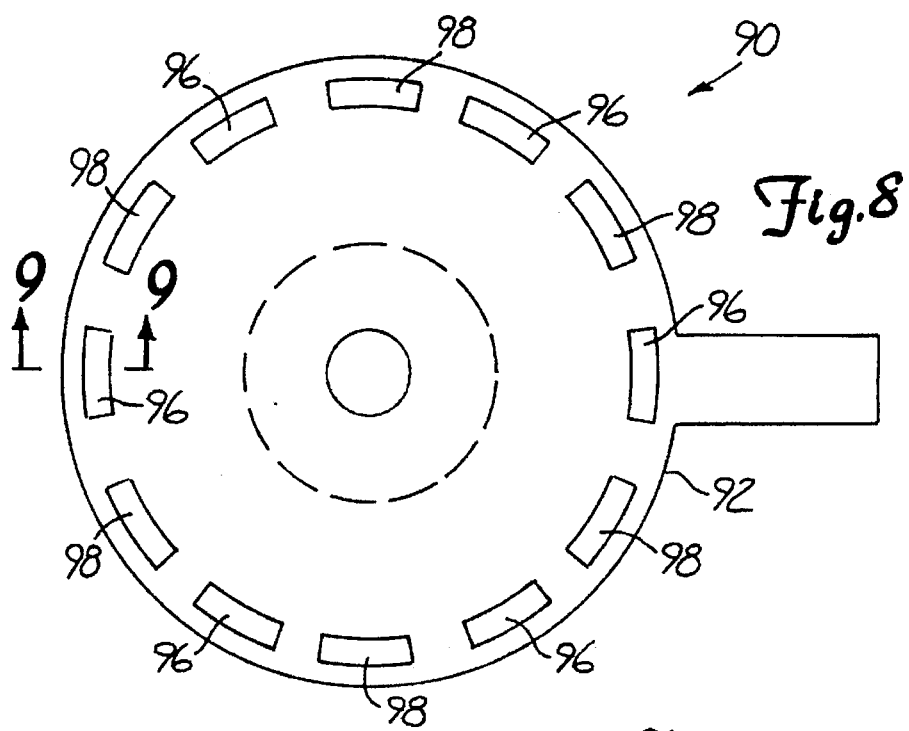
FIG. 8 is a front view of a combination alignment device/orifice plate.
Figure 9:
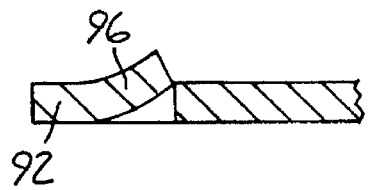
FIG. 9 is a view of the plate of FIG. 8 along line 9—9.

The invention can also be applied to orifice plates, as shown in FIG. 8. As is known, a measurement of differential fluid pressure across an orifice plate can be used as an indicator of flow rate. In FIG. 8, orifice plate 90 comprises a unitary flat plate 92 having a precisely drilled orifice 94 therein, and also having a first set of stamped tabs 96 bent out of the plane of the page and a second set of stamped tabs 98 bent into the plane of the page. Orifice 94 is smaller than the inner diameter of the pipe flanges between which it is sandwiched, such inner diameter being represented by broken circle 100. Orifice 94 is centered relative to the inner (free) edges of tabs 96, 98. Because orifice plates require a relatively thick unitary plate, typically either ⅛ or ¼ inch (3.2 or 6.4 mm), tabs 96, 98 are significantly more rigid than tabs 26, 64, 70, and 72 discussed previously. As a result tabs 96, 98 are sized such that their inner edges mate with the shoulders of opposed pipe flange raised faces with little or no compression of the tabs. The combination orifice plate/alignment ring thereby helps to align not only the pipe conduits but also the precision orifice relative to such conduits. Ridges, pins, and the like can be substituted for tabs 96, 98. FIG. 9 shows the portion of plate 90 along line 9—9 in cross-section.

Although the present invention has been described with reference to preferred embodiments, workers skilled in the art will recognize that changes can be made in form and detail without departing from the spirit and scope of the invention.

What is claimed is:

1. A device for aligning a flowmeter with a pipe flange, comprising:

a unitary flat plate having a central hole therein for fluid passage, the plate also having a first set of tabs defined therein and bent outwardly from the plate, the plate also having a second set of tabs defined therein and bent outwardly from the plate in a direction opposite the first set of tabs, wherein the plate has an annular portion proximate the first and second set of tabs, and wherein a thickness of the annular portion is substantially equal to a thickness of at least the first set of tabs.

2. The device of claim 1, wherein the first and second set of tabs are arranged in an alternating sequence around the central hole.

3. The device of claim 1, wherein the plate further includes a handle extending from the annular portion.

4. The device of claim 1, wherein the plate is composed of a metallic substance.

5. The device of claim 4, further including a grounding cable attached to the plate.

6. An alignment device for coupling a flowmeter to a pipe flange having a raised face, the alignment device comprising:

a unitary plate composed of a metallic material having a substantially flat portion and a central hole therein for fluid passage, the plate also having a plurality of raised areas projecting from the flat portion; for securing the unitary plate to the flowmeter; and wherein the raised areas sized to engage an outside diameter of the raised face and the plate has an annular portion including first and second sets of tabs, and a thickness of the annular portion is substantially equal to a thickness of at least the first set of tabs.

7. The alignment device of claim 6, wherein the securing means is selected from the group consisting of a weld joint, screw, and a clip.

8. The alignment device of claim 6, wherein the plurality of raised areas comprise spring fingers.

9. The alignment device of claim 6, wherein the unitary plate comprises a ring.

10. The device of claim 6, wherein the plate further includes a handle extending from the annular portion.

11. A device for aligning a flowmeter with a pipe flange, comprising:

a unitary flat plate having a central hole therein for fluid passage, the plate also having a first set of tabs defined therein and bent outwardly from the plate, the plate also having a second set of tabs defined therein and bent outwardly from the plate in a direction opposite the first set of tabs; and wherein the plate is composed of a metallic substance the plate has an annular portion proximate the first and second set of tabs, and a thickness of the annular portion is substantially equal to a thickness of at least the first set of tabs.

12. The device of claim 11, wherein the plate further includes a handle extending from the annular portion.

13. An alignment device for coupling a flowmeter to a pipe flange having a raised face, the alignment device comprising:

a unitary plate composed of a metallic material having a substantially flat portion and a central hole therein for fluid passage, the plate also having a plurality of raised areas projecting from the flat portion;

means for securing the unitary plate to the flowmeter; and wherein the raised areas are sized to engage an outside diameter of the raised face and the plate further includes a handle extending from the annular portion.

14. A device for aligning a flowmeter with a pipe flange, comprising:

a unitary flat plate having a central hole therein for fluid passage, the plate also having a first set of tabs defined therein and bent outwardly from the plate, the plate also having a second set of tabs defined therein and bent outwardly from the plate in a direction opposite the first set of tabs; and wherein the plate is composed of a metallic substance the plate further includes a handle extending from the annular portion.

15. The device of claim 6, 13 or 14, further including a grounding cable attached to the plate.

16. The device of claim 11 or 14 wherein the first and second set of tabs are arranged in an alternating sequence around the central hole.

17. The device of claim 13 or 14 wherein the plate has an annular portion proximate the first and second set of tabs, and wherein a thickness of the annular portion is substantially equal to a thickness of at least the first set of tabs.

* * * * *

UNITED STATES PATENT AND TRADEMARK OFFICE
CERTIFICATE OF CORRECTION

PATENT NO. : 5,632,632
DATED : May 27, 1997
INVENTOR(S) : Wendell G. Huotari

It is certified that error appears in the above-indentified patent and that said Letters Patent is hereby corrected as shown below:

Col. 3, lines 32-33, change "$(T_{fm}+T_g)<T<(T_{fm}+T_gT_{pf})$," to --$(T_{fm}+T_g) < T < (T_{fm}+T_g+T_{pf})$,--.

Col. 5, line 36, after "portion;" please start a new element and add the word --means--.

Signed and Sealed this

Fifth Day of May, 1998

Attest:

BRUCE LEHMAN

*Attesting Officer*     *Commissioner of Patents and Trademarks*